United States Patent [19]

Robinson, Jr. et al.

[11] 4,365,672

[45] Dec. 28, 1982

[54] AUTOMATIC ALTERNATING MARKER SYSTEM

[75] Inventors: Edward L. Robinson, Jr., Naperville; Randolph G. Fardal, Chicago; David Anderson, Country Club Hills, all of Ill.

[73] Assignee: International Harvester Co., Chicago, Ill.

[21] Appl. No.: 156,537

[22] Filed: Jun. 5, 1980

[51] Int. Cl.³ .................. A01B 25/00; A01B 63/10
[52] U.S. Cl. .................................. 172/2; 172/127; 172/130
[58] Field of Search ............ 172/2, 4, 7, 9, 126–132; 37/DIG. 1, DIG. 20; 318/280, 290, 739, 747–749; 361/167, 168, 187, 245; 56/10.1, 10.2, 208, DIG. 15

[56] References Cited

U.S. PATENT DOCUMENTS

| | | | |
|---|---|---|---|
| 3,556,226 | 1/1971 | Brewer et al. | 172/130 |
| 3,860,074 | 1/1975 | Maistrelli | 172/9 |
| 3,913,007 | 10/1975 | Gilmore | 318/280 |
| 3,997,826 | 12/1976 | Mayer | 318/739 |
| 4,064,945 | 12/1977 | Haney | 172/7 |
| 4,176,721 | 12/1979 | Poggemiller et al. | 172/4 |
| 4,285,024 | 8/1981 | Andrews | 361/168 |

FOREIGN PATENT DOCUMENTS 2647077   5/1977   Fed. Rep. of Germany .......... 172/7

*Primary Examiner*—Vance Y. Hum
*Attorney, Agent, or Firm*—John W. Gaines; F. D. Au Buchon

[57] ABSTRACT

The automatic alternating marker system is adapted for use with an agricultural planter assembly which has a plurality of planter units, which is adapted to be mechanically and hydraulically coupled to a tractor, and which has hydraulically actuated, first and second extendable markers, each mounted on one side of the planter assembly. Each marker is used to mark, respectively, the track that a tractor wheel should follow on a return planting sweep of the planter assembly for planting properly spaced adjacent rows after the planter assembly has made a first sweep to plant a plurality of rows. The system includes an electrical control circuit for causing extension of the first marker and retraction of the second marker upon the raising of the planters and the turning of the tractor 180°, and for causing extension of the second marker and retraction of the first marker upon the next raising of the planters and the next turning of the tractor 180°. The electrical control circuit includes a pressure sensitive switch connected to the input of a toggle bistable multivibrator which has first and second outputs connected to driver circuits which in turn are connected to first and second solenoid operated valves for operating a respective piston and cylinder assembly for causing extension or retraction of one of the markers.

12 Claims, 3 Drawing Figures

AUTOMATIC ALTERNATING MARKER SYSTEM

CROSS REFERENCE TO RELATED APPLICATIONS

This application is related to co-pending and commonly assigned applications Ser. No. 156,538 (D-3899), filed June 5, 1980 and entitled PLANTER HEIGHT AND MARKER CONTROL SYSTEM, and Ser. No. 156,896 (D-3546), filed June 5, 1980 and entitled SELF LEVELING AND HEIGHT CONTROL HYDRAULIC SYSTEM, now U.S. Pat. No. 4,324,411, the disclosures of which are incorporated herein by reference.

BACKGROUND OF THE INVENTION

1. Field of the Invention

The present invention relates to an agriculture planter assembly which has on either side thereof an extendable and retractable marker for marking the track that a tractor wheel should follow on a return planting sweep after the planter assembly has completed the planting of a plurality of rows and has turned around to plant adjacent rows. More specifically, the present invention relates to an electrical control circuit for providing an automatic alternating marker system whereby the first marker is extended and the second marker is retracted upon the raising of the planters and the turning of the tractor 180° after planting a plurality of rows, and for extending the second marker and retracting the first marker upon the next raising of the planters and the next turning of the tractor 180° for planting a plurality of properly spaced adjacent rows.

2. Description of the Prior Art

Heretofore, it has been proposed to provide an agricultural planter assembly with a marker on each side thereof. Each marker includes two arms pivotably connected to each other at one end thereof, with the other end of one arm being pivotably connected to the planter assembly and the other end of the other arm having a marking disk mounted thereon. A piston and cylinder mechanism is connected to the one arm for causing raising and lowering of the one arm thereby to cause retraction or extension of the marker. Typically, a hydraulic valve assembly is mounted in the cabin of a tractor to which the planter assembly is mechanically and hydraulically coupled with the valve assembly being connected to the piston and cylinder mechanisms associated with each of the markers. Actuation of the valve assembly will cause pressurized hydraulic fluid to be applied to or relieved from the respective piston and cylinder mechanisms. In this way, actuation of the valve assembly will cause retraction of one marker and extension of the other marker.

The disk serves to make a mark or track that a tractor wheel should follow on a return planting sweep of the planter assembly for planting properly spaced adjacent rows after the planter assembly has made a first sweep to plant a first group of rows. Thus, after the planter assembly has made a first planting sweep to plant a plurality of rows and the planters of the assembly are raised and the tractor is turned 180°, the operator of the tractor will actuate the valve assembly to cause the extended marker to be retracted and the retracted marker to be extended. Then the operator will align the tractor so that one of the tractor wheels will follow the track made by the extended marker on the first planting sweep. Also, as the second planting sweep is being made, the extended marker will make a track which the tractor wheel will follow on the succeeding planting sweep, after the present planting sweep is completed, the planters are raised, and the tractor is turned 180°. The sequence is repeated until the planting is finished.

As will be described in greater detail hereinafter, the electrical control circuit of the automatic alternating marker system of the present invention provides for automatic extension of one marker and retraction of the other marker upon the completion of a planting sweep.

SUMMARY OF THE INVENTION

According to the present invention, there is provided for use with an agricultural planter assembly which has a plurality of planter units, which is adapted to be mechanically and hydraulically coupled to a tractor, and which has hydraulically actuated, first and second, extendable markers, each mounted on one side of the planter assembly from the other, for marking, respectively, the track that a tractor wheel should follow on a return planting sweep of the planter assembly for planting properly spaced adjacent rows, electrical control circuit means for causing extension of the first marker and retraction of the second marker upon the raising of the planters and the turning of the tractor 180°, and for causing extension of the second marker and retraction of the first marker upon the next raising of the planter units and the next turning of the tractor 180°.

Further according to the present invention, the electrical control circuit means includes means for sensing the raising of the planter units, a toggle bistable multivibrator having an input coupled to the output of said sensing means, and electrically-operated hydraulic valve means associated with each marker for controlling raising and lowering of the associated marker, said bistable multivibrator having first and second outputs, said first output being coupled to the valve means associated with the first marker and said second output being coupled to the valve means associated with the second marker, said second output being at logic zero when said first output is at a logic one and vice versa.

BRIEF DESCRIPTIONS OF THE DRAWINGS

DESCRIPTION OF THE PREFERRED EMBODIMENT

Figure 1:
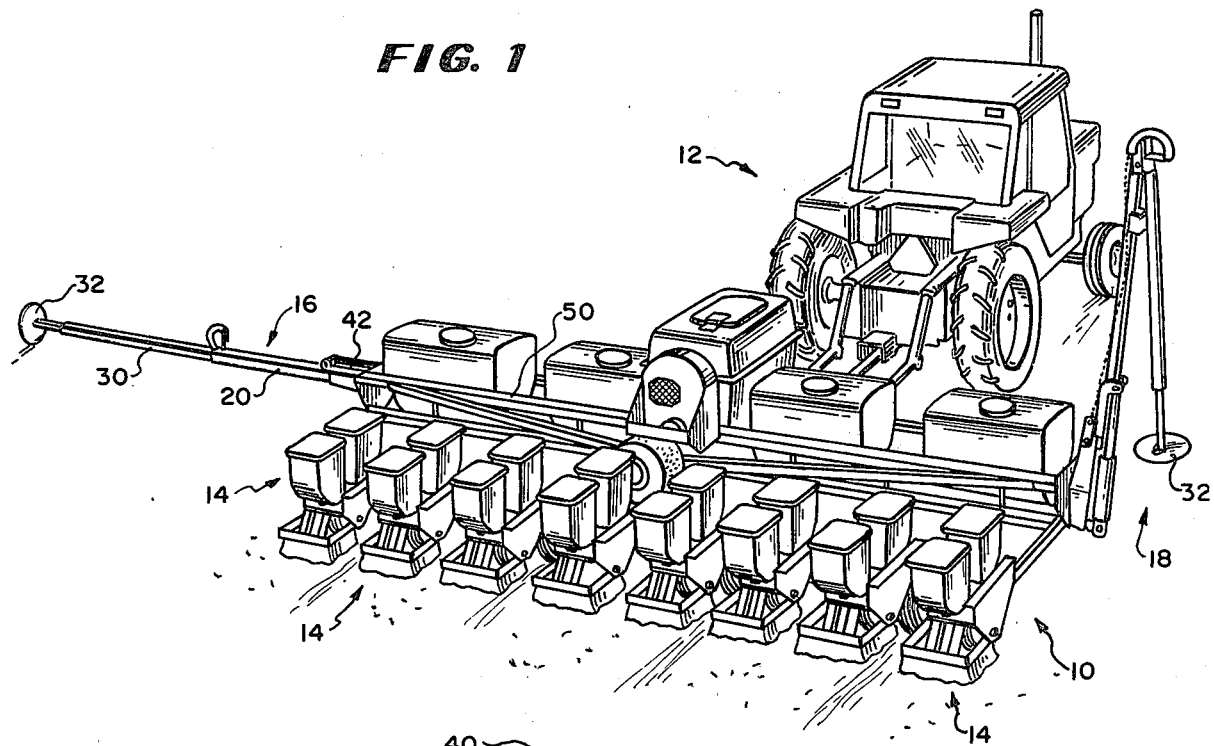
FIG. 1 is a rear perspective view of an eight-row planter assembly being pulled by a tractor with one marker of the assembly being in a raised retracted position and the other marker of the assembly being in an extended position.

Referring now to FIG. 1, there is illustrated therein an eight-row planter assembly 10 as it is being pulled by a tractor 12 for planting a group or plurality of eight rows.

Figure 2:
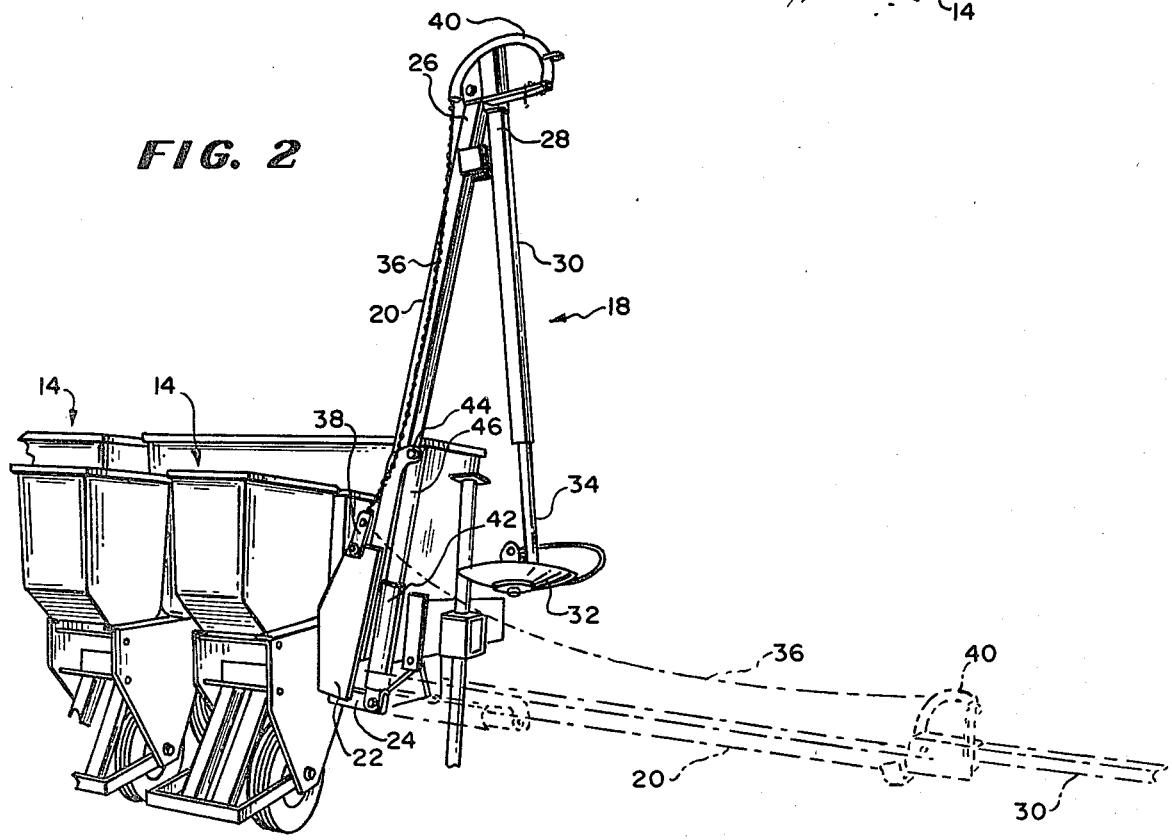
FIG. 2 is a fragmentary perspective view of the retracted raised marker and shows in phantom the position of the arms of the marker when it is extended.

As shown, the planter assembly 10 includes eight planter units 14, a first marker 16 in an extended position, and a second marker 18 in a retracted position. Since the markers 16 and 18 are mirror images of each other, only the marker 18 will be described in detail with reference to FIGS. 1 and 2.

The marker 18 includes a first arm 20 which is pivotally connected at one end 22 to an extending frame member 24 on one side of the planter assembly 10. The second or outer end 26 of the arm 20 is pivotally connected to one end 28 of a second arm 30 which has a marking disk 32 connected to the second or outer end 34 of the second arm 30.

The marker 18 further includes a chain 36 which is connected at one end to a bracket 38 fixed to the first end 22 of the first arm 20 and connected at the other end thereof to a linkage member 40 connected to the first end 28 of the second arm 30. As shown in broken lines in FIG. 2, when the first arm 20 is lowered and the second arm 30 starts to fold out under the force of gravity, the chain 36 is pulled taut to pull on the linkage member 40 to cause the second arm 30 to be extended.

The raising or lowering of the first arm 20 to cause extension or retraction of the marker 18 is affected by a piston and cylinder mechanism 42 which is pivotally connected between the extending frame member 24 and a pivot connection 44 on the first arm 20. When pressurized hydraulic fluid is admitted to the piston and cylinder mechanism 42, a piston rod 46 thereof is extended to cause raising of the first arm 20 thereby to retract the marker 18 to the position shown in FIG. 2. Then, when the pressurized hydraulic fluid is released from the piston and cylinder mechanism 42, the first arm 20 is allowed to drop with the chain 36, causing extension of the second arm 30 as shown in the broken line presentation in FIG. 2.

In the operation of the planter assembly 10, one marker such as the marker 16 is extended so that the marking disk 32 thereof can mark a track while the tractor 12 is pulling the planter assembly 10 to plant eight rows with the planter units 14. At the completion of a planting sweep across a section of land, the planter units 14 are raised. This is accomplished in a known manner by applying pressurized hydraulic fluid to piston and cylinder assemblies associated with wheels (hidden from view and not shown) which are mounted to a frame 50 of the planter assembly 10 to which the planter units 14 are also mounted. When the pressurized hydraulic fluid is supplied to the respective piston and cylinder mechanisms associated with each of the wheels for the planter assembly 10, the wheels are lowered from the frame 50, thereby to cause raising of the planter units 14 above the ground.

At this point, the operator of the tractor 12 will then cause a valve to be operated to retract the marker 16 and to lower the marker 18 as the tractor turns 180° with the planter units 14 raised. After turning, the operator of the tractor 12 aligns a wheel of the tractor with the track made by the marking disc 32 of the marker 16. In this way, after turning 180° and lowering the planter units 14, the operator of the tractor 12 can be assured that with the appropriate wheel aligned to travel along the track made by the marker 16, the outermost, left row made by an outside planter units 14 of the planter assembly 10 will be properly spaced from the next adjacent row of the eight rows just planted.

Heretofore, the extension and retraction of the markers 16 and 18 was controlled manually from the cabin of the tractor 12 by operation of a valve assembly.

The construction and operation of the planter assembly 10 described above is conventional and forms no part of the present invention.

Figure 3:
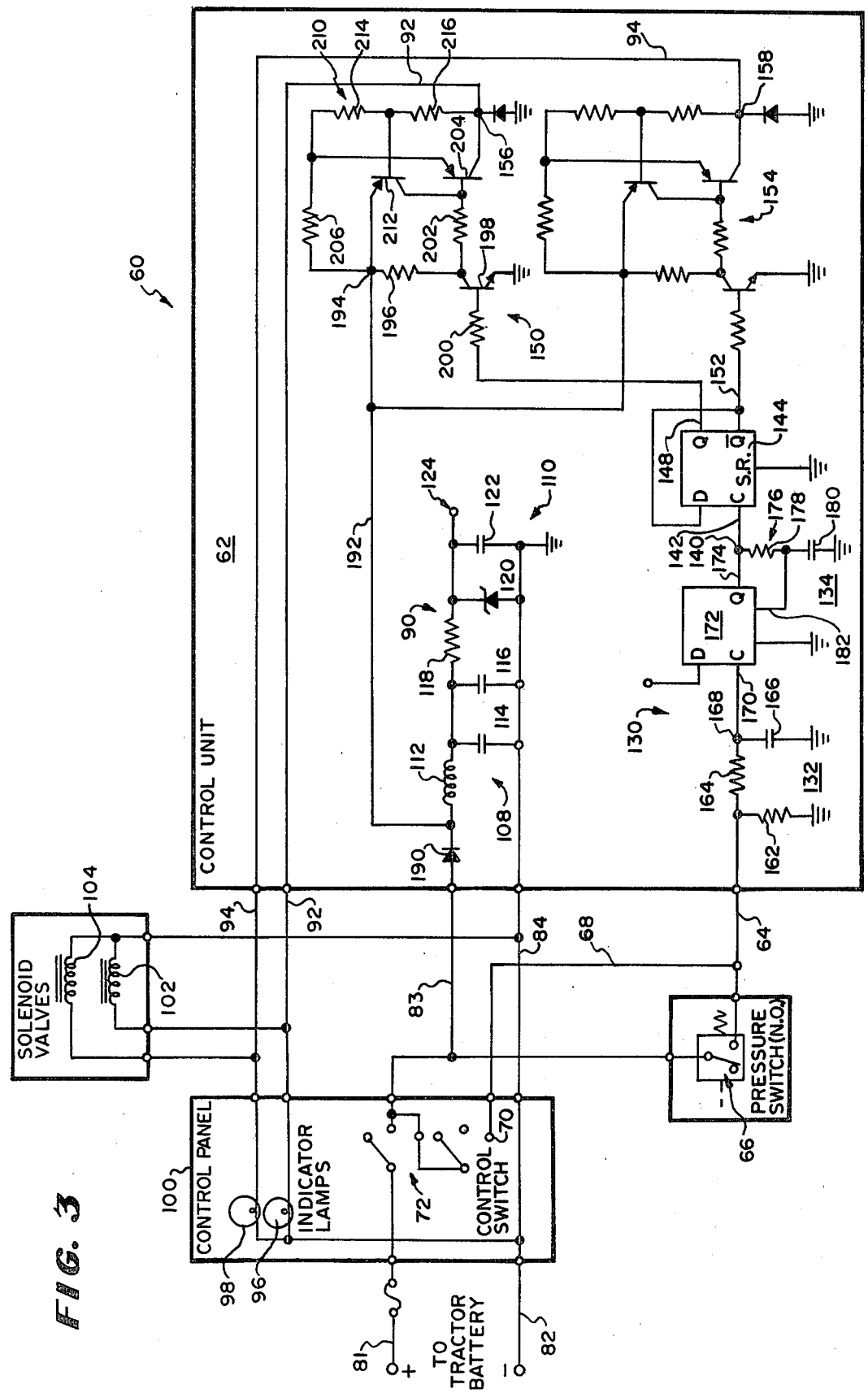
FIG. 3 is a schematic circuit diagram of the electrical control circuit of the automatic alternating marking system of the present invention.

According to the teachings of the present invention, there is provided with the tractor 12 and the planter 10, an automatic, alternating marker system which includes an electrical control circuit 60 illustrated schematically in FIG. 3. The control circuit 60 includes a control unit 62 having an input lead 64 which is connected to one side of a pressure switch 66 which senses the pressure applied to the hydraulic piston and cylinder mechanisms for raising and lowering the wheels of the planter assembly 10. This input lead 64 is also connected by a lead 68 to one terminal 70 of a control switch 72 which is a double pole three-position switch, which is adapted to connect two input lines 81 and 82 to two leads 83 and 84 leading to a voltage regulation circuit 90 forming part of the control unit 62.

The control unit 62 further has two output leads 92 and 94 which are connectable to indicator lamps 96 and 98 mounted on a control panel 100 in the cabin of the tractor 12. Also mounted on the control panel 100 is the control switch 72. The control panel 100 replaces the manually actuated handle of a valve assembly for operating the piston and cylinder mechanism 42 of the markers 16 and 18. Instead, and as will be described in greater detail hereinafter, manual operation of the control switch 72 will cause operation of a first or second solenoid valve (not shown) operated by first and second solenoids 102 and 104 which are connected to the leads 92 and 94 respectively, and which form part of the electrical control circuit 60.

It will be understood that the first solenoid 102 is connected to the hydraulic circuit for the piston and cylinder mechanism 42 for the first marker 16 and when it is energized, it relieves pressurized hydraulic fluid from that piston and cylinder mechanism 42. At the same time, the indicator lamp 96 is turned on to indicate that the first marker 16 is extended. Likewise, when the second solenoid 104 is energized, it causes opening of the associated solenoid-operated valve to relieve pressurized hydraulic fluid from the piston and cylinder mechanism 42 of the marker 18, thereby to enable the marker 18 to be extended. Again, at the same time, the indicator lamp 98 will be energized to indicate that the second marker 18 is extended.

Returning now to the control unit 62, it will be apparent that when the control switch 72 is placed in a second position thereof, a circuit is completed from line 84 connected to the plus side of the tractor battery to the lead 83 leading to the voltage regulator circuit 90. The voltage regulator circuit 90 includes an inductor/capacitor filter circuit 108 and a voltage stabilizing circuit 110 which include, respectively, inductor 112, capacitors 114 and 116, resistor 118, Zener diode 120, and capacitor 122. The voltage regulator circuit 90 provides a regulated voltage output at output terminal 124.

In addition to the voltage regulator circuit 90, the control unit 62 includes a buffer circuit 130 comprising an integrator circuit 132 and a monostable multivibrator or one-shot 134. The input to the buffer circuit 130 is connected to the input lead 64 and an output 140 of the buffer circuit is connected to a toggle input 142 of a toggle bistable multivibrator or flip flop 144. The bistable multivibrator 144 has a first output 148 connected to a first driver circuit 150 and a second output 152 connected to a second driver circuit 154. An output 156 of the first driver circuit 150 is connected to the output lead 92 and an output 158 of the second driver circuit 154 is connected to the other output lead 94.

The integrator circuit 132 includes resistors 162, 164 and capacitor 166. An output 168 of the integrator circuit 132 is supplied to a clock input 170 of a integrated circuit device 172 which is realized by one-half of a 4013 type CMOS integrated circuit. The integrated circuit device 172 has its Q output 174 connected to an RC circuit 176 formed by resistor 178 and capacitor 180. The junction between the resistor 178 and the capacitor 180 is connected to a reset input 182 of the integrated circuit device 172.

As will be described in greater detail hereinafter, when the pressure switch 66 is closed for a predetermined length of time, a clean pulse of predetermined amplitude and short duration is generated at the output 140 of the buffer circuit 130 and applied to the clock input 142 which will cause toggling of the bistable multivibrator 144 to change the signal levels at the outputs 148 and 152, respectively. In this respect, when the Q output 148 has a logic one thereon, the $\bar{Q}$ output 152 has a logic zero. Then, when a toggle signal is applied to the clock input 142, the Q output 148 changes to logic zero and the $\bar{Q}$ output 152 changes to logic one. The toggle bistable multivibrator 144 is realized by the other half of the 4013 type CMOS integrated circuit.

It is to be understood that both integrated circuit devices 172 and 144 are supplied with the regulated voltage appearing at the output 124 of the voltage regulator circuit 90.

When there is a logic one signal level at one of the outputs 148 or 152, the driver circuit 150 or 154 connected thereto is operated to supply current to the solenoid 102 or 104 to operate the associated solenoid valve to relieve pressurized hydraulic fluid from the piston and cylinder mechanism 42 of the first or second marker 16 or 18.

Since the driver circuits 150 and 154 are identical, only the driver circuit 154 will be described in detail.

As shown, the driver circuit 150 is supplied from the lead 83 through a diode 190 and a lead 192 connected to a positive voltage input 194 of the driver circuit 150. The input or junction 194 is connected through a resistor 196 to a trigger transistor 198, the base of which is connected through a resistor 200 to the Q output 148. The collector of the transistor 198 is also connected through a resistor 202 to the base of a power transistor 204.

As shown, the input junction 194 of the driver circuit 150 is connected through a resistor 206 (a 0.2 ohm resistor) to the emitter of the power transistor 204, the collector of which is connected to the output 156.

In operation, a logic one signal at the Q output 148 will turn on the transistor 198 causing current to flow through the resistor 196. This will result in the collector of the trigger transistor 198 going low and this low applied to the base of the power transistor 204 turns on the power transistor 204 so that current can flow via the lead 192 through the junction 194, resistor 206, across the emitter and collector of the power transistor 204 to the output 156 from which it is supplied to the solenoid 102.

To protect the power transistor 204 from thermal runaway, in the event that there is a short circuit in the solenoid 102, the driver circuit 150 includes a foldback or disabling circuit 210 comprising a control transistor 212 and two resistors 214 and 216 which are connected in series across the emitter and collector of the power transistor 204. The junction between the resistors 214 and 216 is connected to the base of the control transistor 212. The resistor 214 is 270 ohms and the resistor 216 is 10,000 ohms. As shown, the emitter of the transistor 212 is connected to the input junction 194 and the collector is connected to the base of the power transistor 204.

If there is a short circuit in the solenoid 102, this will lower the voltage potential at the output junction 156 causing a greater voltage drop and, therefore, a greater power consumption in the transistor 204 because of the greater current through the transistor 204 and the larger voltage drop across the emitter-collector of the transistor 204. This increase in voltage drop across the transistor 204 is sensed by the resistors 214 and 216 resulting in a drop in voltage at the junction between the resistors 214 and 216 which is applied to the base of the control transistor 212. A drop in voltage of 0.7 volt at the base of the transistor 212 starts to turn the transistor 212 on so that current can flow through the transistor 212, through the resistor 202 and the transistor 198 to ground. Such voltage drop across the resistor 202 results in an increase of voltage at the base of the transistor 204, such increase reducing the current flow through the transistor 204, thereby, to reduce the power loss in the transistor 204 and prevent overheating of the transistor 204. In this way, the foldback or disabling circuit 210 prevents thermal damage to the power transistor 204.

In the operation of the control circuit 60 which provides an automatic alternating marker system, the control switch 72 will be moved by an operator to the third position thereof in order to raise one marker and lower the other marker. This is assuming that the desired marker positions need to be changed. If the desired marker such as the first marker 16 is already in the extended position and the second marker 18 is then in the raised, retracted position as shown, the operator will not need to move the switch 72 to the third position thereof, but merely move same to the second position thereof wherein the control circuit 60 is energized. If the operator had moved the control switch 72 to the third position thereof, he would then move it back to the second position to place the control circuit 60 in operation which then provides for automatic operation of the markers 16 and 18.

The automatic extension and retraction of the markers 16 and 18 then takes place in the following manner. In this respect, it is assumed that the marker which it is desired to be extended is the marker 16 which means that there is a logic one signal level at the Q output 148 of the toggle bistable multivibrator 144. This means that the solenoid 102 is energized to enable extension of the marker 16 and solenoid 104 is de-energized to prevent extension of the marker 18. Then when a planting sweep over a section of ground has been completed, the operator of the tractor 12 will operate appropriate valves to cause the wheels of the planter assembly 10 to be lowered, thereby to cause raising of the planter units 14. This creates a buildup of hydraulic pressure in the hydraulic system supplying the piston and cylinder mechanisms for lowering the wheels to raise the planter frame 50. This increase in pressure is sensed by the pressure switch 66 which is then closed to supply a voltage signal via lead 64 to the buffer circuit 130. The buffer circuit 130 is provided to avoid actuation of the bistable multivibrator 144 as a result of contact bounce of the pressure switch 66. In other words, the pressure switch 66 must be closed for a predetermined period of time after sensing a high pressure. In this respect, once the switch 66 is closed, the integrator circuit 132 starts building up a voltage on the capacitor 166. This is a ramp like function and once the voltage level of the ramp function reaches a certain level, this voltage level, applied to the clock input 170 of the integrated circuit 172, triggers same to supply an output voltage which charges the capacitor 180 to a predetermined level. The voltage at the predetermined level resets the integrated circuit 172 so that the circuit 172 together with the resistors 178 and 180 form a monostable multivibrator 134 or one-shot device to provide a clean pulse of predetermined amplitude and a predetermined width to the clock input 142 of the bistable multivibrator 144 to toggle same.

The toggling of the bistable multivibrator 144 results in the signal level at the Q output 148 going from logic one to logic zero and the signal level at the $\bar{Q}$ output 152 going from logic zero to logic one, thereby to de-energize solenoid 102 and energize solenoid 104 and the associated lamps 96, 98. This, of course, will enable the marker 16 to be raised and the marker 18 to be extended.

It will be noted that when the pressure switch opens after the tractor has been turned 180° and the planter units 14 have been lowered, the bistable multivibrator 144 is not actuated. It will only be actuated upon the next raising of the planter units 14.

From the foregoing description, it will be apparent that the automatic alternating marker system comprising the electrical control circuit 60 of the present invention provides a number of advantages, some of which have been described above, and others of which are inherent in the invention. In particular, it provides a simple electrical control system for automatically extending one marker and retracting the other marker of a planter assembly upon each raising of the planters of the planter assembly, so that the proper marker is extended for marking a track which establishes the proper spacing of the next group of rows to be planted relative to the rows that have just been planted.

Also, it will be apparent from the foregoing description that obvious modifications can be made to the electrical control circuit 60 of the present invention without departing from the teachings of the invention. Accordingly, the scope of the invention is only to be limited as necessitated by the accompanying claims.

We claim:

1. An agricultural planter assembly which has a plurality of planter units, which is adapted to be mechanically and hydraulically coupled to a tractor, and which has hydraulically actuated, first and second, extendable markers, each mounted on one side of the planter assembly, for marking, respectively, the track that a tractor wheel should follow on a return planting sweep of the planter assembly for planting properly spaced adjacent rows, said assembly having electrical control circuit means for enabling extension of the first marker and retraction of the second marker upon the raising of the planter units and the turning of the tractor 180°, and enabling extension of the second marker and retraction of the first marker upon the next raising of the planter units and the next turning of the tractor 180°, said electrical control circuit means including operating means therefor for sensing the raising of the planter units, a toggle bistable multivibrator having an input coupled to the output of said sensing means, and logic-output-powered hydraulic valve means, which are in circuit with the sensing means and electrical control circuit means, associated with each of the markers for controlling each one by extending and retracting that marker automatically in response to raising of the planter unit, said bistable multivibrator having first and second outputs, said first output being coupled for applying power when at logic one to the valve means associated with the first marker for extending the latter and said second output being coupled for withholding power when at logic zero to the valve means associated with the second marker for retracting the latter, and vice versa, said second output being at logic zero when said first output is at logic one and vice versa whereby only a certain marker extends on alternate raisings of the planter units and only the other marker has extension on each remaining one of the raisings of the planter units.

2. The electrical control circuit means according to claim 1 wherein each said hydraulic valve means is a solenoid actuated valve.

3. The electrical control circuit means according to claim 4 including a driver circuit coupled between each output of said bistable multivibrator and the solenoid of one of said solenoid actuated valves.

4. The electrical control circuit means according to claim 3 wherein each said driver circuit includes a power amplifier for amplifying the signal from said first or second output of said bistable multivibrator to which it is coupled.

5. The electrical control circuit means according to claim 4 wherein each said driver circuit includes disabling circuit means sensitive to a short circuit in the solenoid of one of said solenoid actuated valves to which it is connected.

6. The electrical control circuit means according to claim 1 including first and second indicator lamps coupled respectively to said first and second outputs of said bistable multivibrator for indicating which output is at a logic one for operating said associated hydraulic valve means for retracting the marker associated therewith.

7. The electrical control circuit means according to claim 6 including manually operated, mechanical switch means coupled to said input of said bistable multivibrator to permit an operator to toggle said bistable multivibrator to cause extension of a desired marker and retraction of the other marker.

8. The electrical control circuit means according to claim 1 including buffer circuit means coupled between said output of said sensing means and said input to said bistable multivibrator for preventing extraneous short signals from operating said bistable multivibrator.

9. The electrical control circuit means according to claim 1 including a regulated power supply circuit adapted to be coupled to the tractor battery for supplying a regulated voltage to said bistable multivibrator, said hydraulic valve means and other circuit components of said electrical control circuit means.

10. An agricultural planter assembly which has a plurality of planter units, which is adapted to be mechanically and hydraulically coupled to a tractor, and which has hydraulically actuated, first and second, extendable markers, each mounted on one side of the planter assembly, for marking, respectively, the track that a tractor wheel should follow on a return planting sweep of the planter assembly for planting properly spaced adjacent rows, said assembly having electrical control circuit means for enabling extension of the first marker and retraction of the second marker upon the raising of the planter units and the turning of the tractor 180°, and for enabling extension of the second marker and retraction of the first marker upon the next raising of the planter units and the next turning of the tractor 180°, said electrical control circuit means including means for sensing the raising of the planter units, a toggle bistable multivibrator having an input coupled to the output of said sensing means, and electrically-operated hydraulic valve means associated with each marker for controlling extension and retraction of the associated marker, said bistable multivibrator having first and second outputs, said first output being coupled to the valve means associated with the first marker and second output being coupled to the valve means associated with the second marker, said second output being at logic zero when said first output is at logic one and vice versa, said electrical control circuit means characterized wherein said sensing means is a pressure sensitive device which sensing the pressure in a hydraulic system for raising and lowering the planter units, said pressure being higher when the planter units are raised, said pressure sensitive device being operable to generate an electrical signal upon sensing the higher pressure, and said electrical signal being supplied to said bistable multivibrator to toggle same to change the logic levels at said first and second outputs.

11. An agricultural planter assembly which has a plurality of planter units, which is adapted to be mechanically and hydraulically coupled to a tractor, and which has hydraulically actuated, first and second, extendable markers, each mounted on one side of the planter assembly, for marking, respectively, the track that a tractor wheel should follow on a return planting sweep of the planter assembly for planting properly spaced adjacent rows, said assembly having electrical control circuit means for enabling extension of the first marker and retraction of the second marker upon the raising of the planter units and the turning of the tractor 180°, and for enabling extension of the second marker and retraction of the first marker upon the next raising of the planter units and next turning of the tractor 180°, said electrical control circuit means including means for sensing the raising of the planter units, a toggle bistable multivibrator having an input coupled to the output of said sensing means, and electrically-operated hydraulic valve means associated with each marker for controlling extension and retraction of the associated marker, said bistable multivibrator having first and second outputs, said first output being coupled to the valve means associated with the first marker and said second output being coupled to the valve means associated with the second marker, said second output being at logic zero when said first output is at a logic one and vice versa, said electrical control circuit means further including buffer circuit means coupled between said output of said sensing means and said input to said bistable multivibrator for preventing extraneous short signals from operating said bistable multivibrator, said electrical control circuit means characterized wherein said buffer circuit means includes an integrator circuit for integrating the signal from said sensing means until the integrated signal reaches a certain level sufficient to cause triggering of said bistable multivibrator thereby to prevent any short signal from actuating said bistable multivibrator.

12. The electrical control circuit means according to claim 11 wherein said buffer circuit means includes a monostable multivibrator coupled between said integrator circuit and said input to said bistable multivibrator, said monostable multivibrator being operable to provide a clearly defined pulse of short duration which is operative to trigger and toggle said bistable multivibrator.

* * * * *